(12) United States Patent
Trela-McDonald et al.

(10) Patent No.: US 10,274,738 B2
(45) Date of Patent: Apr. 30, 2019

(54) FIELD MAPPER

(71) Applicant: PowerPhotonic Ltd, Dalgety Bay (GB)

(72) Inventors: Natalia Trela-McDonald, Dunfermline (GB); Roy McBride, Fife (GB); Howard John Baker, Edinburgh (GB); Matthew Oren Currie, Dunfermline (GB)

(73) Assignee: POWER PHOTONIC LTD. (GB)

( * ) Notice: Subject to any disclaimer, the term of this patent is extended or adjusted under 35 U.S.C. 154(b) by 265 days.

(21) Appl. No.: 15/066,352

(22) Filed: Mar. 10, 2016

(65) Prior Publication Data

US 2016/0266393 A1    Sep. 15, 2016

(30) Foreign Application Priority Data

Mar. 12, 2015    (GB) .................................. 1504203.9

(51) Int. Cl.
*G02B 5/30* (2006.01)
*G02B 27/00* (2006.01)
(Continued)

(52) U.S. Cl.
CPC ...... *G02B 27/0927* (2013.01); *B23K 26/0732* (2013.01); *G02B 5/3083* (2013.01);
(Continued)

(58) Field of Classification Search
CPC ............ G02B 27/0927; G02B 27/0012; G02B 27/0025; G02B 27/0944; G02B 27/0955; G02B 27/4233; G02B 27/425; G02B 27/4277; G02B 27/46; G02B 27/09; G02B 27/0938; G02B 27/095; G02B 5/3083; B23K 26/06; B23K 26/064;
(Continued)

(56) References Cited

U.S. PATENT DOCUMENTS 3,476,463 A       11/1969   Kreuzer
5,864,430 A  *    1/1999   Dickey ............... B23K 26/073
                                                219/121.69
(Continued)

FOREIGN PATENT DOCUMENTS

DE    10 2008 029 946 A1    12/2009
DE    10 2010 005 774 A1    3/2011
(Continued)

OTHER PUBLICATIONS

United Kingdom Intellectual Property Office, Combined Search and Examination Report for GB1504203.9; dated Sep. 11, 2015; entire document; South Wales, United Kingdom.

*Primary Examiner* — Stephone B Allen
*Assistant Examiner* — Adam W Booher
(74) *Attorney, Agent, or Firm* — Law Office of Jesse D. Lambert, LLC

(57) ABSTRACT

A field mapping optical system and method for converting a light beam having a known spatially coherent first optical field to a second optical field with a required intensity distribution and flat wavefront at a desired distance from the system, by creating an intermediate optical field, between the first and second optical fields, the intermediate optical field being derived from the inverse Fourier transform of the second optical field. The optical system provides a compact and simplified field mapper.

19 Claims, 10 Drawing Sheets

(51) Int. Cl.
*G02B 27/09* (2006.01)
*G02B 27/42* (2006.01)
*G02B 27/46* (2006.01)
*B23K 26/073* (2006.01)

(52) U.S. Cl.
CPC ..... *G02B 27/0012* (2013.01); *G02B 27/0025* (2013.01); *G02B 27/0944* (2013.01); *G02B 27/0955* (2013.01); *G02B 27/425* (2013.01); *G02B 27/4233* (2013.01); *G02B 27/4277* (2013.01); *G02B 27/46* (2013.01)

(58) Field of Classification Search
CPC .............. B23K 26/0648; B23K 26/073; B23K 26/0732; B23K 26/0736
See application file for complete search history.

(56) References Cited

U.S. PATENT DOCUMENTS

| | | |
|---|---|---|
| 8,023,206 B2 | 9/2011 | Laskin |
| 9,285,593 B1 * | 3/2016 | Laskin ............... G02B 27/0927 |
| 2003/0179452 A1 | 9/2003 | Lizotte |
| 2004/0061952 A1 | 4/2004 | Coufal et al. |
| 2008/0273557 A1 | 11/2008 | Bloom |
| 2011/0075151 A1 | 3/2011 | Jeong |
| 2011/0157706 A1 | 6/2011 | Mitra et al. |
| 2014/0003456 A1 | 1/2014 | Mikliaev et al. |

FOREIGN PATENT DOCUMENTS

| | | |
|---|---|---|
| JP | 2006072220 A | 3/2006 |
| WO | WO 2005/053895 A1 | 6/2005 |
| WO | WO 2009/090088 A1 | 7/2009 |

* cited by examiner

Plate 1
Maps from Gaussian to
"truncated Airy" with central
lobe and 2 rings

Plate 2
Restores flat phase
(Needs localised λ/2 phase steps for outer rings)
May correct for final lens aberrations

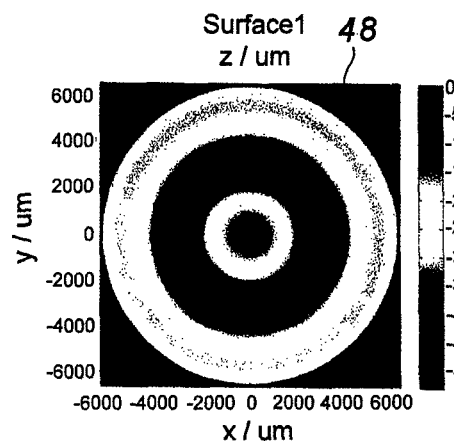 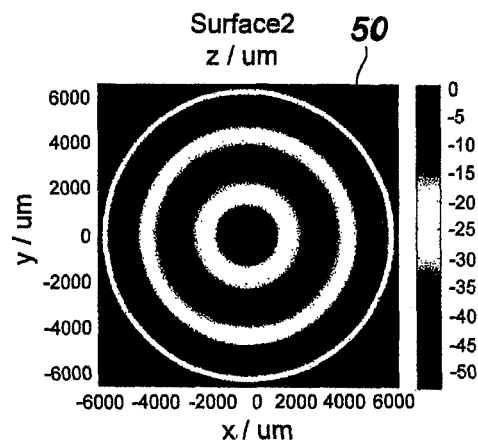
Figure 13a    Figure 13b
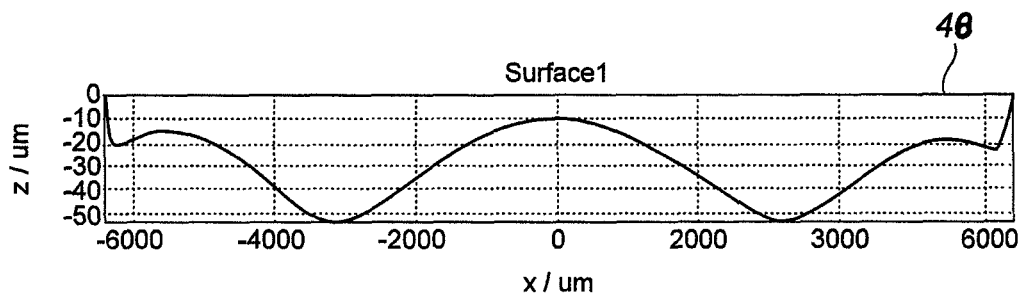
Figure 14a
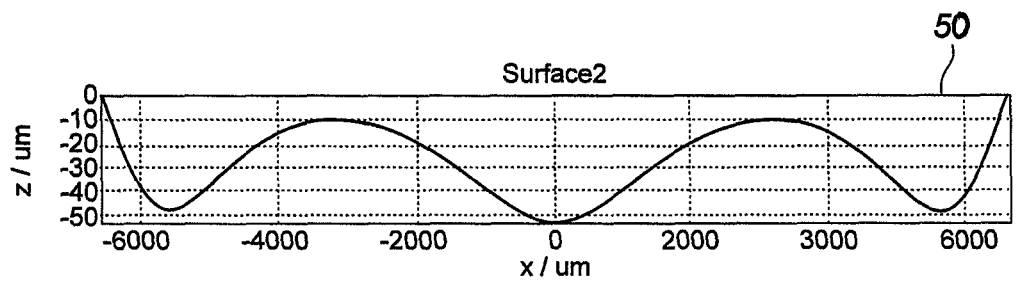
Figure 14b

FIELD MAPPER

The present invention relates to laser beam field mapping and in particular, though not exclusively, to a field mapping optical system and method for field mapping for converting a light beam having a known spatially coherent first optical field to a second optical field with a required intensity distribution and flat wavefront at a desired distance from the system, by creating an intermediate optical field, between the first and second optical fields, the intermediate optical field being derived from the inverse Fourier transform of the second optical field.

Lasers are used in a variety of industrial applications, for example in materials processing, drilling and micro-welding. In conduction welding, using a laser as the energy source greatly enhances the flexibility, quality, weld strength and ability to automate the welding process. However, the most significant enhancement is made on shaping the laser beam intensity profile. A typical Gaussian intensity distribution, while providing sufficient intensity to melt the weld point also wastes a lot of energy in heating around the weld point from the tails of the beam. Increasing the intensity to reduce the fraction of power in the tails of the beam causes the intensity at the weld point to increase past the evaporation threshold, detrimentally affecting the weld by removing material. The solution is to create a flat top intensity distribution where the intensity lies between the melting threshold and the evaporation threshold.

Laser field beam mapping may be used to shape the beam profile of, typically, a single mode laser, with optical elements referred to as field mappers. The fundamental principle can be considered in terms of ray-optic propagation of a laser beam with Gaussian intensity distribution: an optical surface is calculated by deflecting these rays with respect to their weighted intensity to produce a desired output intensity distribution. In this way a beam with a Gaussian intensity distribution can be transformed in to e.g. a flat-top intensity distribution. More generally, beams with other intensity distributions may be propagated using diffraction-based calculations, with a similar result.

The simplest prior art field mapper consists of a single optic which creates a divergent beam with a desired distribution in the far-field. A lens surface can be integrated in to the single field mapping optic in order to image the far-field intensity distribution onto a focal plane at a specific distance relative to the single field mapping optic. Alternatively, a separate lens can be used to achieve the same result.

This field mapper is most commonly used in applications where a divergent beam with a shaped intensity distribution is required, such as in the generation of laser lines. Additionally, this field mapper finds use in applications which require a large and uniform laser spot, such as laser illumination.

A disadvantage of this field mapper is that the depth of focus over which the desired intensity distribution is maintained is significantly reduced. This occurs because, as the phase-flat wavefront propagates through the single field mapping optic, the wavefront becomes non-flat due to the optical path difference (OPD) between rays relative to their distance from the optical axis. The non-flat wavefront causes the desired intensity distribution to degrade more quickly as it evolves either side of the focal plane.

To overcome this disadvantage, the single field mapping optic may be combined with a phase correcting optic. The far-field generated by the single field mapping optic is imaged, either by a separate element or an integrated lens, onto a focal plane and the phase correcting optic is placed at the focal plane generated. The phase correcting element produces a phase change that flattens the wavefront at the focal plane. The phase correcting element is designed to match the single field mapping optic output. Flattening the wavefront with the phase correcting optic has the advantage of correcting the angular deflection that was induced by the single field mapping optic; effectively collimating the beam. This collimated flat top beam then has the desired intensity distribution in the near-field, which gradually degrades as the beam propagates to ultimately create an Airy pattern in the far-field.

This 'near-field' field mapper is used primarily in materials processing. Such applications typically require the flat top image to be far smaller than the size of the input beam, and to be located at a process plane which must be several tens of millimetres from the last optical surface. To achieve this, the 'near-field' field mapper is most commonly applied in conjunction with an image relay system that images the near-field of the beam at the plane of the phase correcting optic onto a process plane. This allows for end-user control of the spot size by varying the focal powers of lenses used in the relay system.

However, many emerging materials processing applications require very small spots which in turn may require unreasonably long image relay systems and/or focussing lenses with a high NA.

Further in order to preserve the benefits the wavefront flatness of the image plane in the process plane, a wavefront preserving image relay, such as a 4f system, must be used. This further increases the complexity and expense of the image relay.

It is an object of the present invention to provide an optical system as a field mapper which overcomes at least some of the disadvantages of the prior art field mappers.

It is an object of at least one embodiment of the present invention to provide an optical system as a field mapper which provides a desired intensity distribution and flat wavefront at a chosen process plane.

According to a first aspect of the present invention there is provided a field mapping optical system for converting a light beam having a known spatially coherent first optical field to a second optical field with a required intensity distribution and flat wavefront by creating an intermediate optical field, between the first and second optical fields, the optical system comprising:

one or more transmissive refractive optical elements, the one or more elements arranged to provide a first optical section and a second optical section;

the first optical section being configured to modify the wavefront of the first optical field to provide an intensity distribution of the intermediate optical field immediately after the second optical section;

the second optical section being configured to modify the wavefront of the beam on exiting the first optical section to provide a wavefront of the intermediate optical field immediately after the second optical section;

the second optical field being created a distance from an exit of the second optical section; and the intermediate optical field being derived from the inverse Fourier transform of the second optical field.

Thus instead of using a field mapper system to produce a desired intensity distribution with a flat wavefront and then imaging this to get a beam with the same intensity distribution and flat wavefront at a process plane, which is a desired distance from the last surface of the field mapper, the present invention uses an field mapping optical system to produce an intermediate optical field based on the inverse Fourier transform of the desired intensity distribution and flat wavefront. This then provides the opportunity of using a simple focussing lens to create the desired intensity distribution and flat wavefront at a selected distance to the process plane.

In an embodiment, the distance is in the far-field. Thus the process plane is considered to be in the far-field and the intermediate optical field will propagate to become the second optical field in the far-field.

Preferably, a focusing lens is located after the second optical section to produce the second optical field at a back focal plane of the focusing lens. In this way, the distance to the process plane can be kept small providing a compact system.

More preferably, the focusing lens is located immediately after the second optical section to produce the second optical field and the distance is to the back focal plane of the focusing lens. In this way, a compact system is provided.

Alternatively, the front focal plane of the focusing lens is located immediately after the second optical section to produce the second optical field and the distance is to the back focal plane of the focusing lens.

Preferably, the intermediate optical field is substantially the inverse Fourier transform of the second optical field.

In an alternative embodiment, the front focal plane of the focusing lens is located before the exit of the second optical section, there being a virtual intermediate optical field created at the front focal plane which is the inverse Fourier transform of the second optical field and wherein the intermediate optical field is a Fresnel transform of the virtual intermediate optical field. In this way the intermediate optical field is not the inverse Fourier transform but is derived from the inverse Fourier transform.

Advantageously, the focusing lens has a focal length less than or equal to 200 mm. In this way, the distance between the second optical section and the process plane can be kept small. The focussing lens may have a focal length less than 100 mm. More preferably, the focal length is less than 50 mm. Advantageously, the lens is an off the shelf (OTS) lens. In this way, costs are kept down.

Preferably, the first and second optical sections each comprise one or more optical surfaces. More preferably, the first optical section comprises a first transmissive refractive optical element including first entry and first exit optical surfaces and the second optical section comprises a second transmissive refractive optical element including second entry and second exit optical surfaces. In this way, the optical system may comprise only two optical elements and a focusing lens which keeps the construction simple.

Alternatively, the first optical section comprises an entry surface of a transmissive refractive optical element and the second optical section comprises an exit surface of the transmissive refractive optical element, the transmissive refractive optical element being a monolithic optic. In this way, fewer optical components are required which further simplifies construction.

Preferably, the transmissive refractive optical element is a freeform refractive optic, otherwise known as a phase plate. Such phase plates are known and available from the applicant, PowerPhotonic Ltd, UK. Alternatively, an optical section comprises a phase plate and a further lens. In this way, a phaseplate with a manufacturable sag and an off-the-shelf (OTS) lens can be used where the beam dimensions and system setup are such that the required sag on each optical element is deeper than can be manufactured as a phase plate alone.

In an embodiment, the focusing lens is integrated onto a rear surface of a final optical element of the second optical section. In this way, the intermediate beam may be created in the plane of the phase plate of the second optical section further reducing the number of optical elements in the system.

The intermediate optical field may be truncated. In this way, the beam is re-sized due to the finite aperture of the next optical element in the system. The truncation may be controlled to provide trade-off between manufacturability and conformity of the output field distribution.

Additionally, the second optical field may be apodized. This will improve the quality of the focus at the process plane.

Preferably, a separation between an exit of the first optical section and an entry of the second optical section is less than or equal to 300 mm. The separation distance between the two optical sections can be selected in the design so that the optical system can be kept compact. Preferably, the separation distance is less than 150 mm. More preferably, the separation distance is less than or equal to 100 mm. Increasing the separation distance can also reduce the sag required on the optical elements which may make such elements manufacturable.

Preferably, the second optical section is further configured to correct for aberration of the focusing lens. Alternatively, the focusing lens is a telecentric or non-telecentric F-theta lens with a 1D or 2D galvoscanner. In an embodiment, the focusing lens comprises a plurality of lenses.

Preferably, the required intensity distribution of the second optical field has a circularly symmetric intensity profile. Alternatively, the required intensity distribution of the second optical field has an intensity profile separable in radius and azimuth. A further alternative may be for the required intensity distribution of the second optical field has an intensity profile separable in x and y coordinates with z being a direction of the beam through the optical system. The required intensity distribution of the second optical field may be selected from a group comprising: flat top circular, circular M-profile, circular trident, flat top square, flat top rectangular and flat top annular profile.

According to a second aspect of the present invention there is provided a method for designing a field mapping optical system according to the first aspect, the method comprising the steps:

selecting the required intensity distribution for the second optical field;

calculating the inverse Fourier transform of the second optical field and deriving the intermediate optical field; and designing one or more transmissive optical elements to create the intermediate optical field immediately after the second optical section.

In this way, a compact optical system can be designed which does not require an image relay system to deliver a beam of desired intensity distribution with a flat wavefront at a process plane.

Preferably, the method includes the step of selecting the distance. In this way, the distance between the final optical surface in the system and the process plane can be chosen to suit the application with the optical system designed to fulfil this requirement.

Preferably, the method includes the step of selecting a lens with a focal length to provide second optical field at a desired distance. In this way, an off the shelf focusing lens can be placed at any desired position from the end of the second optical section to obtain the desired intensity distribution with a flat wavefront.

Preferably, the method includes selecting a desired separation between an exit of the first optical section and an entry of the second optical section. In this way, the system can be made as compact as required.

Preferably, the method includes designing the optical elements to truncate the intermediate optical field so as to fit in an aperture of the focusing lens. In this way, there is no beam spillage through the compact arrangement.

Embodiments of the present invention will now be described, by way of example only, with reference to the accompanying drawings of which:

FIG. 13(*a*) is a 2D surface map of the exit surface of the first plate and FIG. 13(*b*) is a 2D surface map of the entry surface of the second plate;

FIG. 14(*a*) is a graph of the surface profile of the exit surface of the first plate and FIG. 14 (*b*) is a graph of the surface profile of the entry surface of the second plate;

Figure 1:
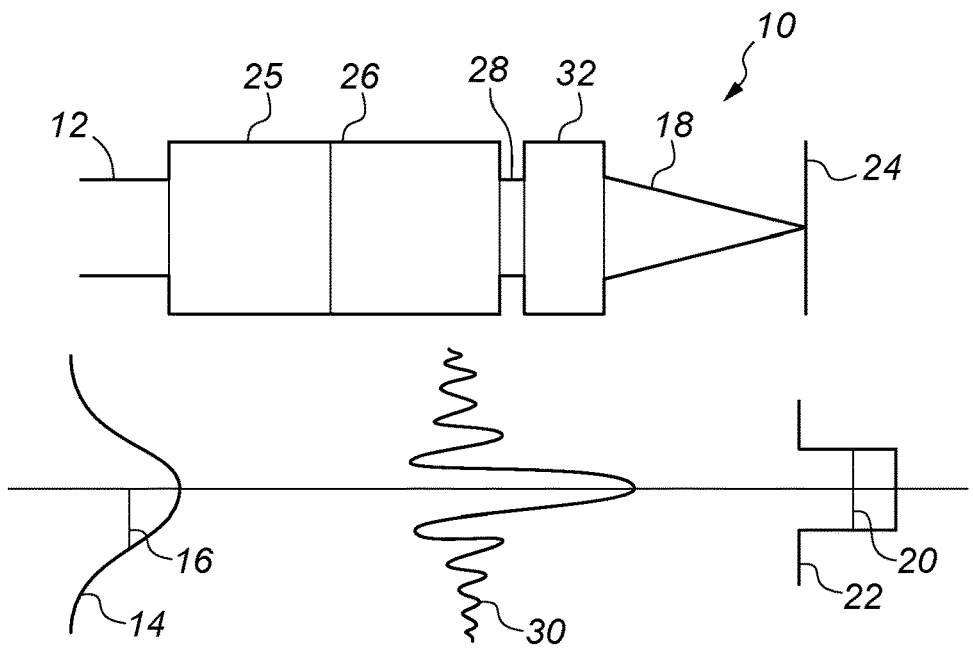
FIG. 1 is a schematic illustration of a field mapping optical system according to an embodiment of the present invention.

Reference is initially made to FIG. 1 of the drawings which illustrates a field mapping optical system, generally indicated by reference numeral 10, for converting an input beam 12 having a known optically coherent first optical field 14 to an output beam 18 having a second optical field 22 with a required intensity distribution and flat wavefront at a distance 24 from the optical system 10, by creating an intermediate optical field 30 between the first and second optical fields 14,22 according to an embodiment of the present invention.

The optical system 10 includes a one or more transmissive refractive optical elements arranged in a first optical section 25 and a second optical section 26, along the path of the beam 12. The first optical section 25 is configured to modify the wavefront of the first optical field 14 to provide an intensity distribution of the intermediate optical field 30. The second optical section 26 is configured to modify the beam 12 on exiting the first optical section 25 to provide a wavefront of the intermediate optical field 30 immediately after the second optical section 26. The distance 24 is calculated from the exit of the second optical section 26. In the preferred embodiment there is a lens 32 located after the second optical section 26. In this embodiment, the first and second optical sections 25,26 are configured to perform intensity and phase shaping of the input beam 12 and output an intermediate beam 28 with an intermediate optical field 30 and the lens 32 is configured to convert the intermediate beam 28 to the output beam 18 at the distance 24. The distance 24 can be considered as a focal plane or a process plane. In this embodiment, the intermediate beam optical field 30 is the inverse Fourier Transform of the second optical field 22. Thus the optical system 10 may be considered as a field mapper.

The input beam 12 is typically from a single mode laser and, in the example given, the beam has a Gaussian profile which has a first beam radius 16. While a Gaussian beam is illustrated, the invention can be performed with an input beam 12 having any optical field which can be determined for the purposes of mapping the intensity distribution. For ease of analysis, rotationally symmetric beam profiles are preferable, but beam profiles that are separable in x and y, such as an elliptical Gaussian, are also manageable.

The output beam 18 has a second optical field 22 which is chosen to best suit the application required. In the Figure, a flat top hat profile is shown to reflect that the beam 18 would be suitable for welding. Indeed, the beam would be suitable for micro-welding due to the small spot size 20 which can be created. Of note is the fact that this spot size and optical field are provided at a selected distance 24 from the optical system 10. Where the lens 32 is a focussing lens, the distance 24 is the focal length of the lens. Any optical field whose inverse Fourier transform can be generated by intensity and phase field mapping of the input beam. Again, for ease of calculations, those with a circularly symmetric intensity profile may be favoured, though those with an intensity profile separable in radius and azimuth, or separable in x and y coordinates with z being a direction of the beam through the optical system, are also available. Those skilled in the art will recognise flat top circular, circular M-profile, circular trident, flat top square, flat top rectangular and flat top annular profiles.

The optical system 10 comprises three parts, a first optical section 25, a second optical section 26 and a lens 32. The first and second optical sections can be considered as an optical field mapper assembly 26. Optical field mapper assemblies are known and are described in the prior art. Typically they comprise a first optical element used to map the intensity distribution and a phase corrector for returning the wavefront to a plane wavefront following mapping. This is as described hereinbefore with reference to the single field mapping optic being combined with a phase correcting optic. However, where the assemblies differ is in that the prior art assembly will be mapping the optical field of an input beam directly to the desired optical field of the output beam whereas, in the present invention, the assembly is mapping the optical field 14 of the input beam 12 to an inverse Fourier Transform of the desired optical field 22 of the output beam 18. The inverse Fourier Transform may be referred to as an intermediate optical field 30 which is produced in a corresponding intermediate beam 38 at the exit of the second optical section 26.

On exiting the second optical section 26 the intermediate beam passes through a lens 32. In its simplest case lens 32 may be an off the shelf (OTS) focussing lens. Alternatively it may be an f-theta lens or a scanning lens as are known to those skilled in the art. Using the principle that the function of a lens is to convert position to angle, which is the equivalent function of a Fourier Transform, the lens 32 performs an approximate Fourier Transform on the inverted Fourier Transform, thus creating the desired optical field 22 in the output beam 18 at the focal plane of the lens 32, at distance 24.

As the lens 32 can be a simple focussing lens, its focal length will determine the position of the focal plane which is the distance 24 relative to the optical system 10. Thus the distance 24 will be the working plane for the application. As the focal length for the lens 32 can be selected, the distance to the working plane can be kept small i.e. less than 100 mm and advantageously less than or equal to 50 mm.

By way of example only, the design flow for an optical system 10 for converting an input beam 12 with a Gaussian optical field to an output beam 18 with a circular flat top optical field distribution, will be described.

Figure 2:
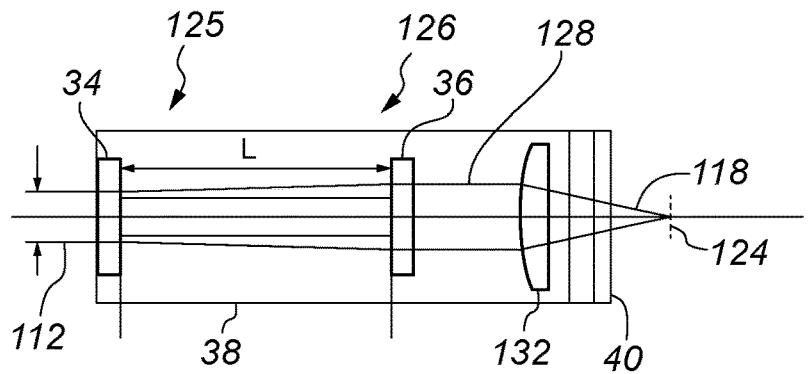
FIG. 2 is a schematic illustration of a field mapping optical system according to a further embodiment of the present invention.

Referring now to FIG. 2 of the drawings there is illustrated an optical system 110, according to an embodiment of the present invention. Like parts to those of FIG. 1 have been given the same reference numeral, with the addition of 100, to aid clarity. In the system 110, the first optical section comprises a first plate 34 and the second optical section 126 is a second plate 36. Each plate 34, 36 is a transmissive refractive optical element with the first plate 34 being equivalent to a single field mapping optic and the second plate 36 being equivalent to a phase correcting optic. Each plate 34, 36 is of silica which can be processed to provide any desired surface shape. The lens 32 is located adjacent the second plate 36 and the system is placed in a housing 38. In this embodiment the first plate 34 is the entry window to the housing and a plane exit window 40 is provided on the far side. The housing 38 provides an integrated cell for the optical system 110.

For this demonstration purpose, the desired output beam 118 at the distance 124 is selected to have the key parameters of a spot size 120 of 30 microns diameter with a circular flat top optical field 122. We also select a focal length for the lens 32 of EFL=40mm, which is considered as the distance 24 and a separation distance between the first and second plates 34,36 as L=100 mm.

We shall assume the input beam 112 is has a Gaussian optical field 114 with a beam radius 116 of 4.95 mm.

For the desired second optical field 122 at the focal plane 124, one can establish the intermediate optical field 130 at the exit of the second plate 36, by propagating the desired optical field 122 from lens focal plane 124 back to the lens 32 aperture. When the exit of the second plate 36 is at the front focal length of the focusing lens 132, the intermediate field 130 at the exit of the second plate 36 can be calculated as Fourier transform of the desired optical field 122, with suitable scaling of axes.

Figure 3:
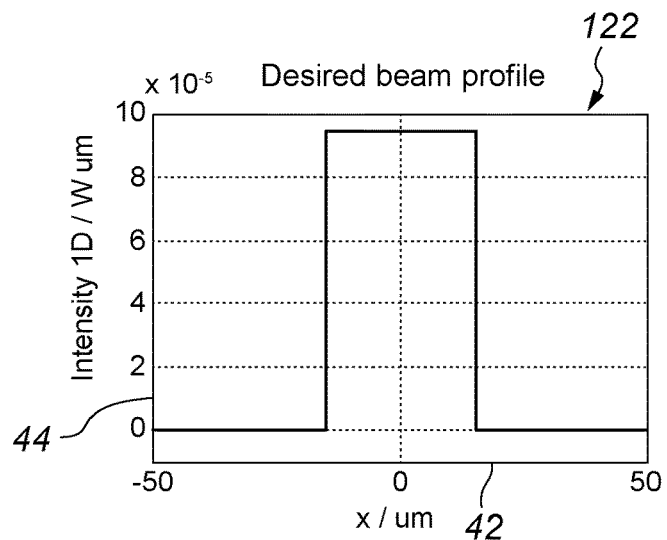
FIG. 3 is a graph of intensity versus radial distance for a flat top circular beam profile.

FIG. 3 shows the desired flat top distribution 122 at focal plane 124 of the focusing lens 32. This is a plot of distance 42 versus intensity 44 illustrating a radially symmetric beam profile.

Figure 4:
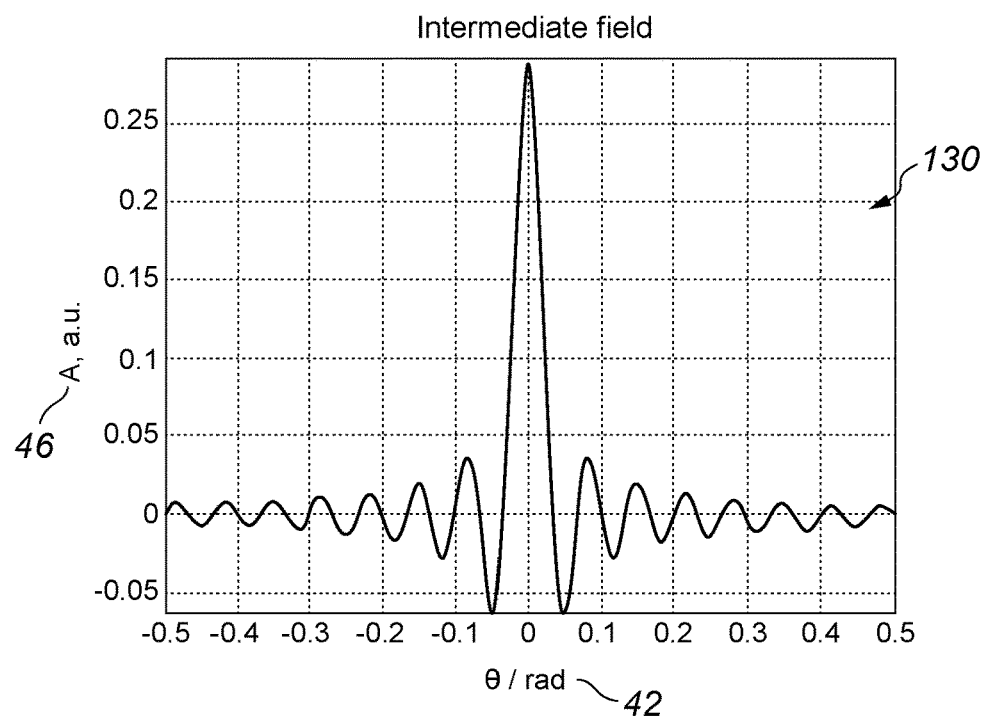
FIG. 4 is a graph of the intermediate field distribution.

FIG. 4 shows the calculated intensity 46 of the intermediate beam 128 for the desired optical field 122. This is the inverse Fourier transform of the circular flat top optical field 122. The intermediate optical field 130 is an Airy pattern as is known in the art.

For the real case, the Airy pattern needs to be truncated due to the finite size of the optics, notably the input aperture of the lens 132. The impact of the truncation of the intermediate beam 128 can be quantified by propagating the truncated intermediate optical field 130 to the focal plane 124 of the lens 132. Truncating the beam also allows a selection of the extent of the inverse Fourier transform to be included. Thus the intermediate optical field 130 is more correctly described as being derived from the inverse Fourier transform.

Figure 5A:
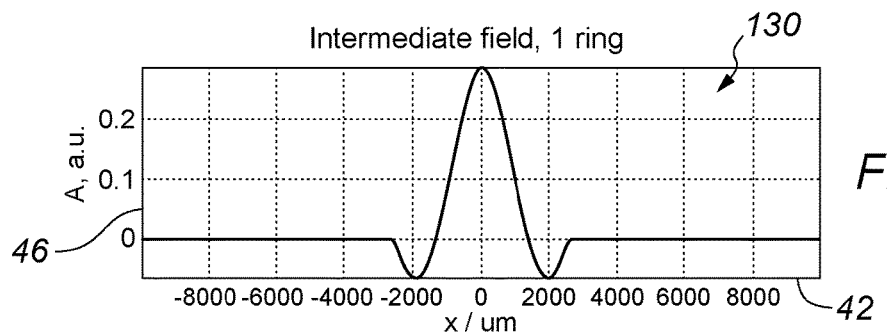
FIG. 5(*a*) is a graph of a two ring Airy pattern field distribution with FIG. 5(*b*) being a graph of the Fourier transform of FIG. 5(*a*)
Figure 5B:
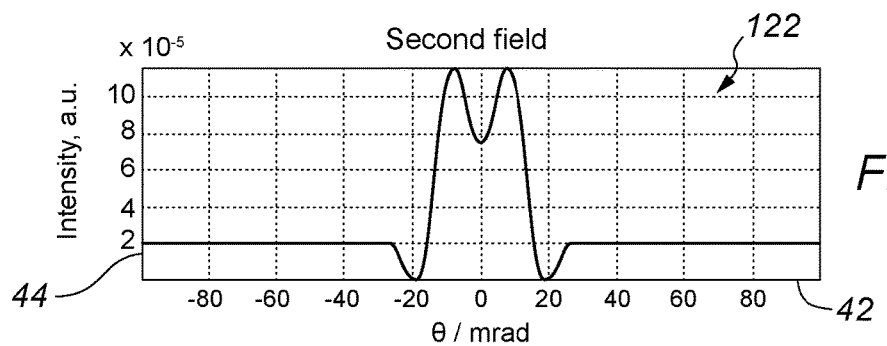
Figure 6A:
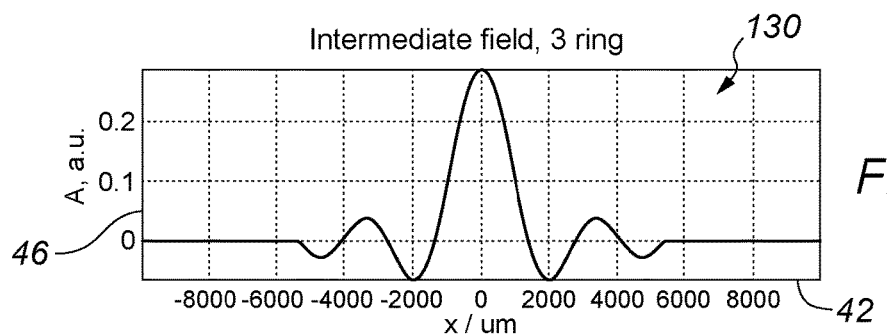
FIG. 6(*a*) is a graph of a three ring Airy pattern field distribution with FIG. 6(*b*) being a graph of the Fourier transform of FIG. 6(*a*)
Figure 6B:
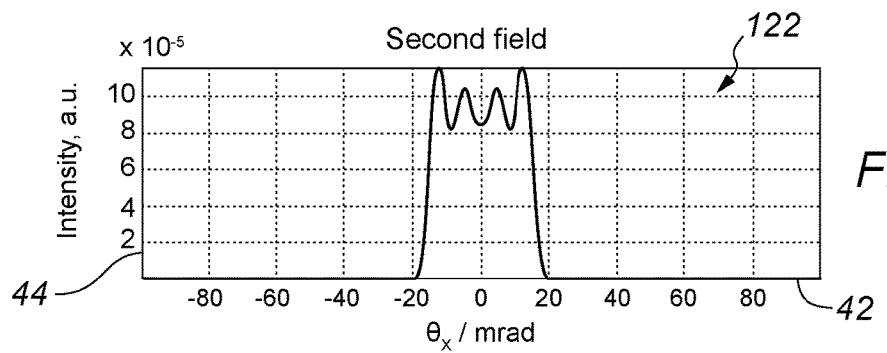

FIGS. 5 and 6 show that for the present design, the calculations indicate that including three or more rings of the Airy pattern in the intermediate beam 128 will produce a good flat top optical field 122 at focal plane 124 of focussing lens 132. These calculations are made by taking the Fourier Transform of the calculated intermediate optical field. FIG. 5(a) shows the intermediate optical field for an Airy pattern of two rings and FIG. 6(a) is for three rings. The resulting intensity distribution for the Fourier transform is shown in FIGS. 5(b) and 6(b) respectively. For the two rings, the desired flat top profile is more 'Peaky' with a significant central dip. A smoothing over the flat top is seen for the three rings.

Figure 7A:
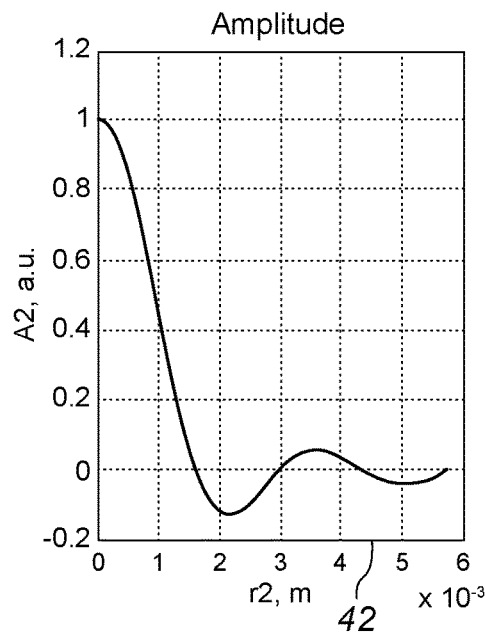
FIG. 7(*a*) is a graph of amplitude versus radius and FIG. 7(*b*) is the corresponding graph of intensity versus radius.
Figure 7B:
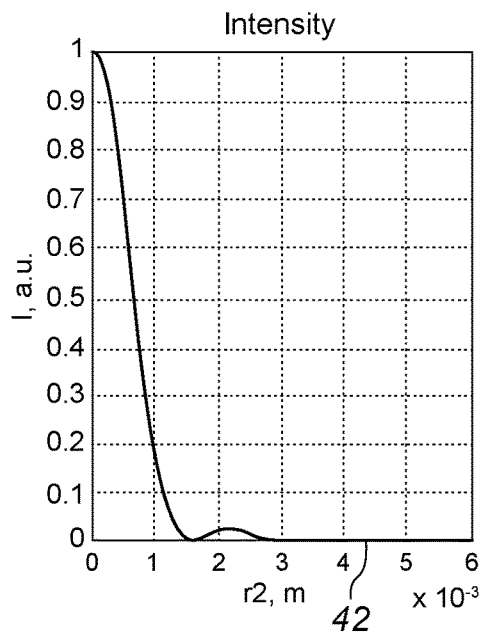

In order to create the three ring Airy pattern after the second plate 36 as the intermediate optical field 130 the first and second plates 34,36 require to be designed to provide the required intensity and phase distribution. The radial plots of the intermediate amplitude and intensity distribution are shown in FIGS. 7(a) and 7(b) respectively.

Figure 8:
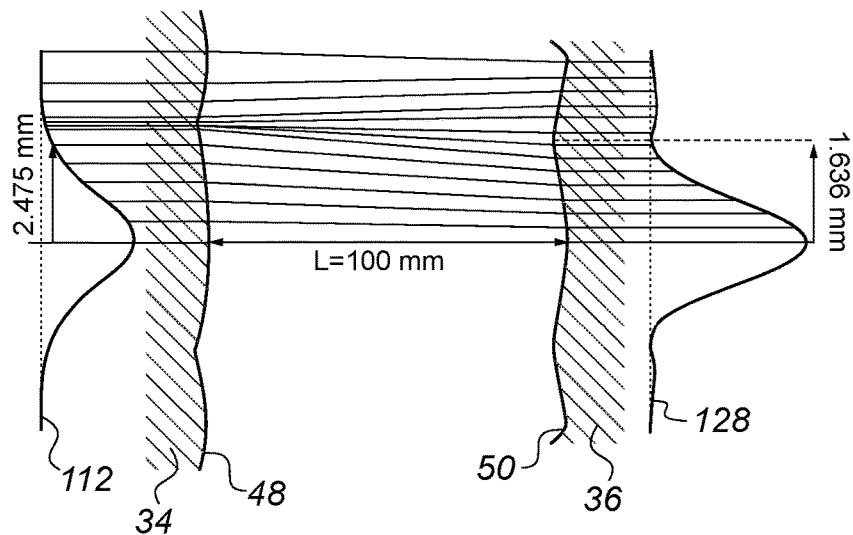
FIG. 8 is a schematic illustration to demonstrate intensity mapping with a single Airy pattern ring.

The next step in the design flow is therefore to map the Airy pattern intensity distribution onto the second plate 36. The first plate 34 produces the desired intensity distribution at the second plate 36 by mapping points with equal encircled power between the two planes. FIG. 8 illustrates the principle of intensity mapping with a single ring shown for clarity. Here the shapes of the exit surface 48 of the first plate 34 and the entry surface 50 of the second plate 36 are calculated to provide to map the input Gaussian beam 112 with a flat wavefront to the intermediate Airy pattern beam 128.

The input beam is a flat wavefront Gaussian beam with the intensity distribution described as:

$$I_1(r_1) = e^{2\frac{r_1^2}{w_0^2}}$$

where w0 is the $1/e^2$ beam radius and r1 is the radial coordinate at the first plate 34.

The field at the second plate 36 is described by Airy pattern which has a general form:

$$A_2(\theta) = \frac{2J_1(kw_t \sin\theta_f)}{kw_t \sin\theta_f}$$

where $J_1$ is the first order Bessel function of the first kind, $w_t$ is the spot radius of the desired output, $k=2\pi/\lambda$ is the wavenumber and $\theta_f$ is the far field angle, which can be translated to the position at the focusing lens by:

$$r_2 = f\tan(\theta_f)$$

where f is the focal length of the focusing lens and r2 is the radial coordinate at the second plate 36.

The diameter of the second plate $d_2$ is selected so that the intermediate field is truncated in a controlled manner. Here the field is truncated after the third ring of Airy pattern. To calculate the equivalent diameter $d_2$, one can find zero crossing points for the Airy pattern from:

$$kw_t\sin\theta = z_n \approx 0, 3.8317, 7.0156, 10.1735, 13.3237, 16.4706\ldots$$

where $z_n$ is n-th zero crossing of the Bessel function. For the fourth zero crossing:

$$kw_t\sin\theta = z_4 \approx 13.3237$$

therefore in paraxial approximation:

$$\theta = \frac{z_4}{kw_t}$$

and $$\frac{d_2}{2} = f \cdot \theta_f \approx f \cdot z_4 \approx 5.89 \text{ mm}$$
$$\phantom{\frac{d_2}{2}} \quad kw_t$$

The Gaussian intensity distribution at the first plate 34 is now converted into an Airy pattern intensity distribution at the second plate 36 by mapping points with equal encircled power from the first plate 34 to the second plate 36.

The exact solution for normalised radial integral for the field at the second plate 36 is given as:

$$E_2(r_2) = \frac{1 - J02(a \cdot r_2)^2 - J1(a \cdot r_2)^2}{1 - J0(b)^2 - J1(b)^2}$$

$$E_2(r_2) = \frac{1 - J_0^2(a \cdot r_2)^2 - J_1^2(a \cdot r_2)^2}{1 - J_0^2(b)^2 - J_1^2(b)^2}$$

where $J_0$ is the second order Bessel function of the first kind, and a is a scaling factor mapping zero crossings of Bessel function onto $r_2$ and $$a = \frac{kw_t}{f},$$

and b defined as:

$$b = a \cdot \frac{d_2}{2}.$$

Figure 9:
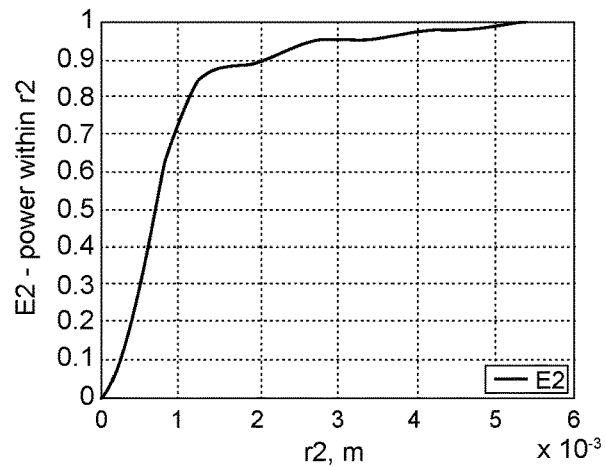
FIG. 9 is the graph of the radial integral for the intensity distribution of the intermediate beam.

This is illustrated in FIG. 9 as the radial integral for the intensity distribution at the second plate 36.

The radial integral for the input beam 12 can be calculated as:

$$E_2(r_2) = 1 - \exp\left(-2 \cdot \frac{r_1}{\omega_0^2}\right)$$

The energy conservation condition may then be written as:

$$E_2(r_2) = E_1(r_{1a}(r_2))$$

where $r_{1a}$ is radius at plate 1 matched onto the equal encircled energy point at plate 2. In order to find $r_{1a}(r_2)$ that meet that condition we solve the equation:

$$E_2(r_2) = 1 - \exp\left(-2 \cdot \frac{r_{1a}(r_2)}{\omega_0^2}\right)$$

therefore:

$$\ln(1 - E_2(r_2)) = -\frac{2r_{1a}(r_2)}{\omega_0^2}$$

and $$r_{1a}(r_2) = \omega_0 \sqrt{\frac{-\ln(1 - E_2(r_2))}{2}}$$

Figure 10:
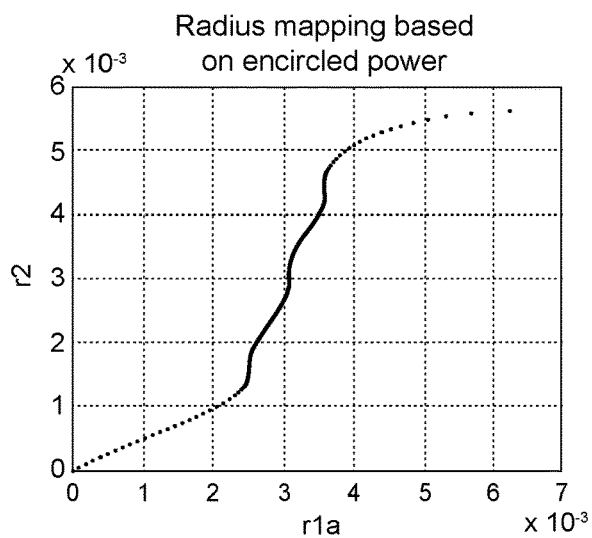
FIG. 10 is a plot of radius mapping based on encircled power.

The resulting radius mapping based on equal encircled power at the radius of the beams 12,128 at the first and second plates 34,36 is shown in FIG. 10. The points of equal encircled power at the two plates then determine the deflection angles on the first plate 34 and the second plate 36, as calculated later in the design.

At this stage we calculate the forms of the two surfaces that generate the ray deflection and OPD that produce the required intensity mapping and a flat wavefront after the second plate 36.

Figure 11:
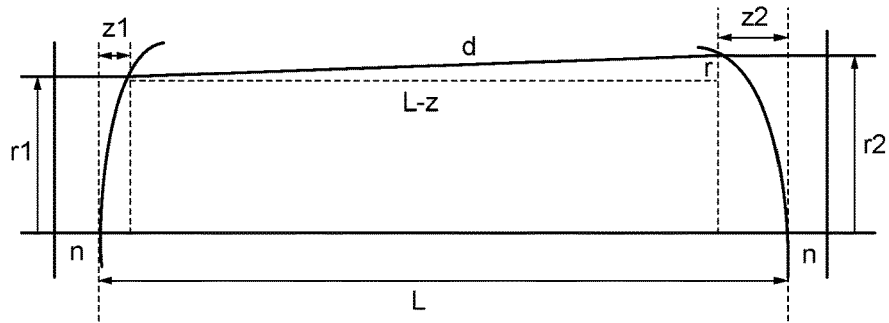
FIG. 11 is a schematic illustration of the plates to illustrate the parameters.

Referring now to FIG. 11 to assist in calculating surface slope and integrating surface shape, for a constant OPD (flat wavefront) after the second plate 36 we need:

$$L = d + z_n.$$

where $$d^2 = r^2 + (L-z)^2,$$

and $$z = z_1 + z_2, \quad r = r_2 - r_1$$

So $$(L - z_x)^2 = r^2 + (L - z)^2$$

Solving for z gives:

$$z(r_2) = \frac{L}{n+1}\left(1 - \sqrt{1 + \frac{r^2}{L^2}\frac{n+1}{n-1}}\right)$$

Ray angles linking points with equal encircles power:

$$\theta(r2) = \text{atan}\left(\frac{r_2 - r_{1a}}{L + z(r_2)}\right)$$

where z ($r_2$) is the OPD correction calculated earlier.

The second plate 36 surface slope is given as:

$$\tan\phi 2(r_2) = \frac{\sin\theta(r_2)}{\cos\theta(r_2) - n}$$

where n is the refractive index of silica glass.

To reconstruct the surface shape for the first plate 34 and the second plate 36, a cumulative trapezoidal numerical integration is used over r1a and r2, respectively.

Up to this point, the two plates 34, 36 produced an Airy pattern with flat phase. In order to ensure the intermediate optical field 130 after the second plate 36 is equivalent to the optical field calculated earlier in FIG. 4, one must match the phase of the intermediate field (which for the Bessel function region with negative field value correspond to a phase shift of n produces by an OPD of λ/2).

Figure 12:
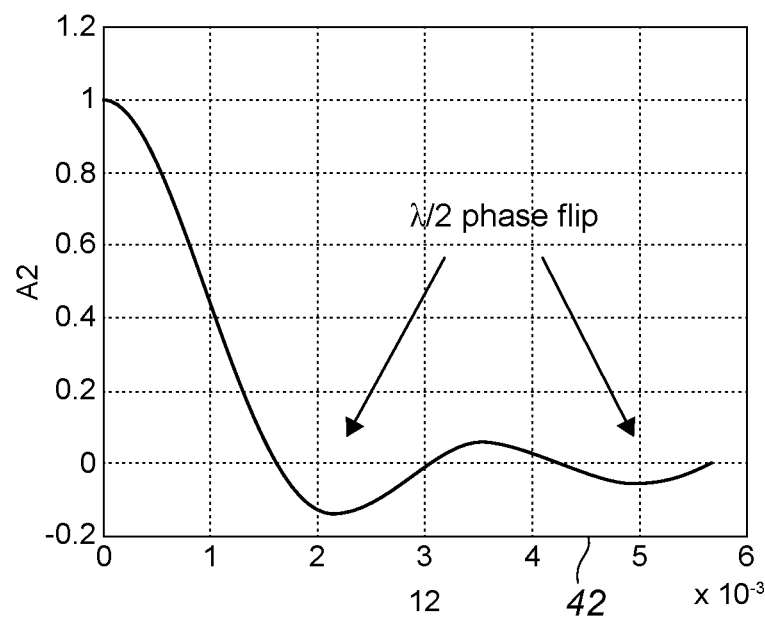
FIG. 12 is graph of field versus radius to show phase flips.

The appropriate phase shift is added at the second plate 36 as a surface height difference of λ/2(n−1). These "phase flips" are illustrated in FIG. 12 on the amplitude curve.

The provides a resultant exit surface 48 shape of the first plate 34, together with the exit surface 50 shape of the second plate 36, which is a corrected shape for the second plate 36 with the phase flips added.

For these calculated radial profiles, one can obtain the 2D surface maps by 2π rotation. Such surface maps are illustrated in FIGS. 13 (a) and (b) for the surfaces 48,50 on each plate 34,36 respectively. Corresponding calculated surface profiles are illustrated in FIGS. 14 (a) and (b) respectively showing the required contouring of each surface 48,50 to achieve the desired field mapping.

Thus the system 110 shown in FIG. 2, provided with first and second plates 34,36 having surfaces 48,50 as calculated and shown in FIGS. 13 and 14, will take a Gaussian beam input 112 of beam radius 116 of 4.95 cm and produce an output beam with a spot size 120 of 30 mm and a circular flat top optical field 122 at the focal plane 124.

It will be appreciated that this worked example is for illustrative purposes only and those skilled in the art will appreciated that other methodologies may be used to achieve the same results. In this example, the input 112 and output 118 beams had rotational symmetry and likewise the plates 34,36 and lens 132 all have rotational symmetry. The techniques may, however, be applied in the x and y directions to provide desired output beams with non-rotational symmetry.

It will also be appreciated that, while this worked example describes a specific case where an exact closed-form solution is available, the same results could be obtained by purely numerical calculations, and similar numerical calculations may be used to calculate the solutions for other cases where a closed form solution is not available.

For this embodiment, we have assumed that the focusing lens acts as a Fourier transform element. It will be apparent to those skilled in the art that the system 10,110 can work without the lens 32, by making the distance in the far-field.

Figure 15:
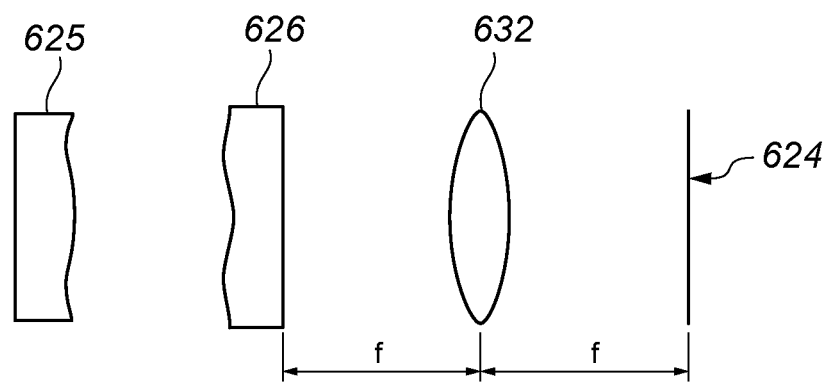
FIG. 15 is a schematic illustration of a field mapping optical system according to a further embodiment of the present invention.

The second optical field 622 will be an exact Fourier transform of the intermediate optical field 630 only when the intermediate optical field 630 is in the front focal plane of the focusing lens 632 and the second optical field 622 is in the back focal plane 634 of focusing lens 632. This condition will be satisfied when the intermediate optical field 630 is formed immediately after the second optical section 626 and the focusing lens 632 is placed at a distance equal to its focal length from that plane. Such an arrangement is illustrated in FIG. 15. This requirement for focal length separation may introduce a practical problem: if the focal length is long, for example >100 mm, this may result in a process head with an undesirably long physical length which is undesirable in a machining application.

Figure 16:
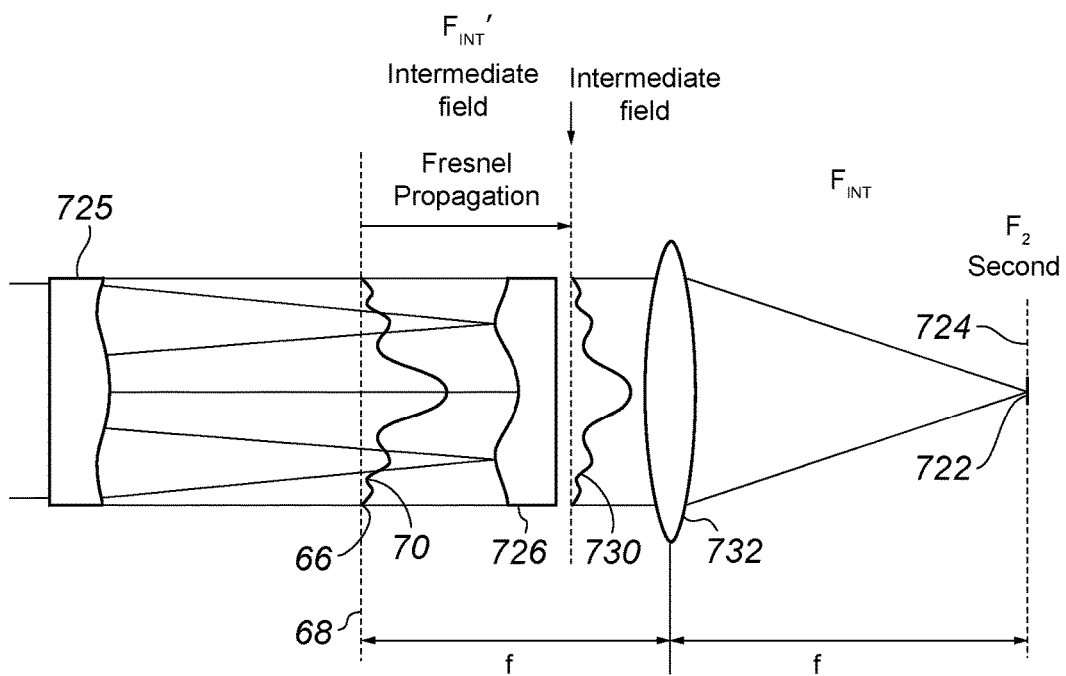
FIG. 16 is a schematic illustration of a field mapper optical system according to a still further embodiment of the present invention.

A further embodiment can provide a solution. In this arrangement, illustrated in FIG. 16, the design of the first and second optical sections 725,726 is modified so that a virtual image 66 of the inverse Fourier transform of the second optical field 722, this being a virtual optical field 70, is formed at the front focal plane 68 of the focussing lens 732, the focussing lens 732 having a focal length f. We first calculate the virtual optical field 70, then propagate it by distance f using a fresnel transformation, which is easily calculated numerically. This defines a propagated optical field which is the intermediate optical field 730 at the exit of the second optical section 725. The same design flow as described hereinbefore with reference to FIG. 2 can be used to provide the designs for the first and second optical sections 725,726 that generate this propagated intermediate field. In this way, the intermediate optical field 730 is not an exact inverse Fourier transform of the second optical field 722, but is derived from the inverse Fourier transform.

Figure 17:
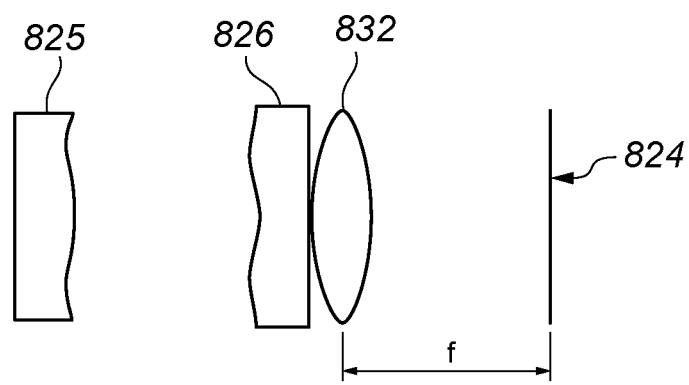
FIG. 17 is a schematic illustration of a field mapping optical system according to a yet further embodiment of the present invention.

A more pragmatic solution can be formed which is illustrated in FIG. 17. The intermediate optical field 830 is formed immediately after the second optical section 826 and the focusing lens 832 is placed close to that plane (i.e. not at focal length separation). In this case we will produce an approximation of the Fourier transform of the intermediate optical field 830 near the focal point of the focusing lens 824. The second optical field 822 will therefore not be the ideal theoretical value, but will in many cases be close enough for the requirements of the application. An additional benefit of this approach is that it allows different lenses 832 to be placed in the same location, allowing the size of the focussed spot to be varied in proportion to the focal length of the lens 832.

There are a number of system variations that can be made to the optical system 10 depending on the spot shape, optical field, beam dimensions and system setup. Beam dimensions primarily affect a system set up while the spot shape and optical fields affect the optical surface shapes of the optical elements in optical sections 25,26.

In a system having a single optical element 34,36 in each optical section 25,26, the beam dimensions, specifically the diameter, affect the total sag of both optical elements: the larger the beam the higher the sag required in both optical elements, for constant separation, L, between the optical sections. This can be mitigated to a certain degree by increasing the separation, L, between the two optical sections, which acts to decrease the required sag. If the beam dimensions and system setup are such that the required sag is deeper than what is manufacturable, the surface of one or both of the optical elements in the optical sections may be split in to a phaseplate and a lens. This allows the phaseplate to have a manufacturable sag and the lens may be bought off-the-shelf (OTS) if possible.

FIGS. 18(a)-18(e) show illustrations of various embodiments of the optical system 10 illustrating the potential number of optical elements. The basic arrangement of a single optical element 34 being a field mapper plate 58 in the first optical section 25 and a second optical element 36 being a phase corrector plate 60 in the second optical section 26 is shown in FIG. 2. The lens 132 completes the optical system 110.

Figure 18A:
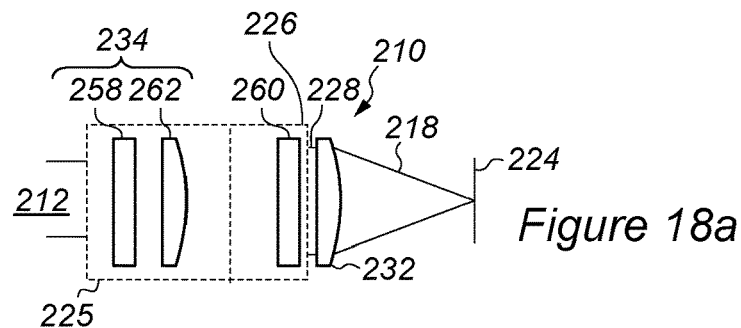
FIGS. 18(*a*)-(*e*) are schematic illustrations of field mapping optical systems according to further embodiments of the present invention.

In FIG. 18(a), an optical system 210, according to a further embodiment of the present invention is shown. Like parts to those of FIG. 1 have been given the same the same reference numeral with the addition of 200. The first optical element 234 is now split into a field mapper plate 258 with an OTS lens 262. With the phase corrector plate 260, this provides the first and second optical sections with three optical elements. The lens 232 completes the system 210 with the input beam 212 being converted to an intermediate beam 228 at the exit of the second optical section 226 and subsequently being converted to the output beam 218 at the focal plane 224.

Figure 18B:
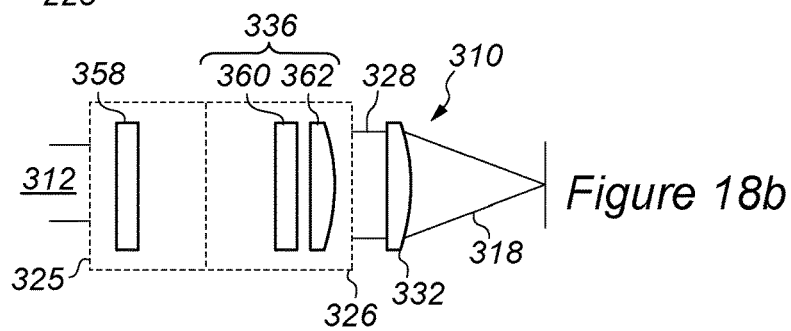

In FIG. 18(b), it is the phase corrector plate 360 which has now beam split with an OTS lens 362. As the field mapper plate 258 is a single optical element, this arrangement again provides the first and second optical sections with three optical elements. The lens 332 completes the system 310 with the input beam 312 being converted to an intermediate beam 328 at the exit of second optical section 326 and subsequently being converted to the output beam 318 at the focal plane 324.

Figure 18C:
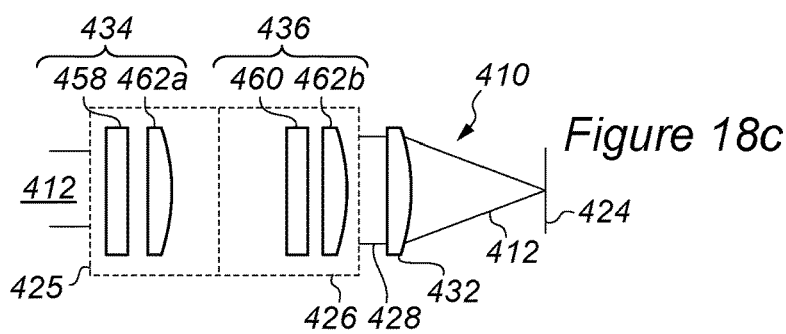

In FIG. 18(c), both the optical elements are in two parts with the field mapper plate 458 and the phase corrector plate 460 being split to give each an OTS lens 462a,b. This arrangement provides the first and second optical sections with four optical elements. The lens 432 completes the system 410 with the input beam 412 being converted to an intermediate beam 428 at the exit of the second optical section 426 and subsequently being converted to the output beam 418 at the focal plane 424.

Figure 18D:
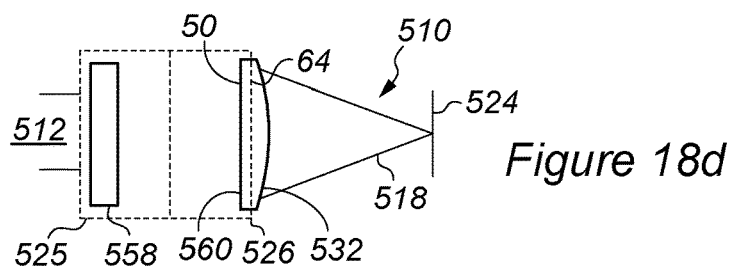

FIG. 18(d) shows an alternative embodiment of the first and second optical sections. In this arrangement there is a field mapper plate 558 and a phase corrector plate 560, but the phase corrector plate now incorporates the lens 532. This is possible as it was the entry surface 50 of the second plate 36 which was shaped to achieve the required intensity and phase matching. Consequently, the rear surface or exit surface is machined to provide the lens 532. This arrangement provides an optical system 510 with two optical elements, there being no additional lens outside the optical section 526. The input beam 512 is converted to an intermediate beam 528 which only exists in the plane 64 of the phase corrector plate 560, which is subsequently converted to the output beam 518 at the focal plane 524.

Figure 18E:
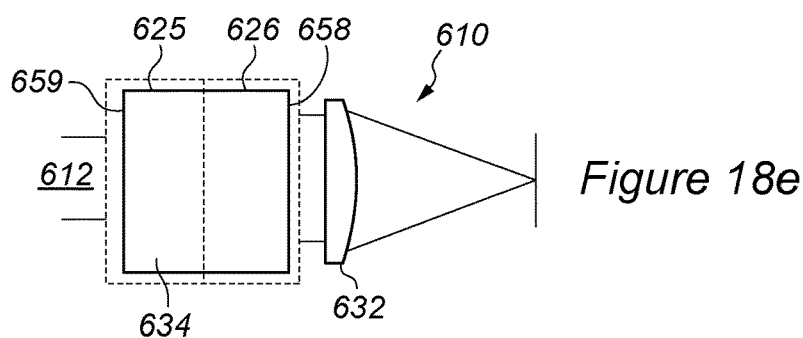

FIG. 18(e) shows further embodiment of the first and second optical sections. In this arrangement, the first and second optical sections 625,626 are together in a single monolithic optical element 634. The entry surface 659 is shaped to provide the field mapper plate and the exit surface 658 is machined to provide the phase corrector plate. Thus the first and second sections 625,626 are optical surfaces and, together with the lens 632, this arrangement provides an optical system 610 with two optical elements.

Various other embodiments are also realised in, for example, the lens may be an f-theta lens or a scanning lens as are known in the art. The focussing lens may be an arrangement of multiple lenses. Additionally, the optical elements may have coatings or treatments to improve their performance. For example, designing the first optical section so as to apodize the intensity profile at the intermediate plane in the optical system will improve the flatness of output beam.

In still further embodiments, the spot size of the output beam at the distance 24 can be varied. In the embodiment described with reference to FIG. 2, the spot size is selected at the start and is fixed. In an embodiment, the focusing lens 32 is replaced with a zoom lens. This would provide a variable spot size when required. An alternative embodiment is to have a fixed focal power focusing lens 32 in combination with a variable beam expander. In this case, these the intermediate optical field is expanded by the variable beam expander and then focused by the focusing lens.

The principal advantage of the present invention is that it provides an optical system in the form of a field mapper which provides a desired optical field at a chosen distance which allows for very small focussed shaped spots without the requirement for large and expensive image relay systems.

A further advantage of the present invention is that it provides an optical system in the form of a field mapper which provides a desired optical field at a chosen distance which requires only a few optical components, some of which may be OTS.

It will be appreciated by those skilled in the art that modifications may be made to invention herein described without departing from the scope thereof. For example, the system can be packaged in a housing with a window at either end. Additionally the optical system can be combined with a laser in the housing.

We claim:

1. A field mapping optical system for converting a light beam having a known spatially coherent first optical field to a second optical field with a required intensity distribution and flat wavefront by creating an intermediate optical field, between the first and second optical fields, the optical system comprising:
one transmissive refractive optical element, the one element arranged to provide a first optical section, being an entry optical surface of the one element, which produces an optical field with the desired intensity distribution and a second optical section, being an exit optical surface of the one element, which corrects for phase and provides the flat wavefront;
the first optical section being configured to modify the wavefront of the first optical field to provide an intensity distribution of the intermediate optical field immediately after the second optical section;
the second optical section being configured to modify the wavefront of the beam on exiting the first optical section to provide a wavefront of the intermediate optical field immediately after the second optical section;
the second optical field being created a distance from an exit of the second optical section;
the intermediate optical field being derived from the inverse Fourier transform of the second optical field; and
the transmissive refractive optical element being a monolithic optic.

2. A field mapping optical system according to claim 1 wherein a focusing lens is located after the second optical section to produce the second optical field at a back focal plane of the focusing lens.

3. A field mapping optical system according to claim 2 wherein the focusing lens is located immediately after the second optical section to produce the second optical field and the distance is to the back focal plane of the focusing lens.

4. A field mapping optical system according to claim 2 wherein the front focal plane of the focusing lens is located immediately after the second optical section to produce the second optical field and the distance is to the back focal plane of the focusing lens.

5. A field mapping optical system according to claim 2 wherein the front focal plane of the focusing lens is located before the exit of the second optical section, there being a virtual intermediate optical field created at the front focal plane which is the inverse Fourier transform of the second optical field and wherein the intermediate optical field is a Fresnel transform of the virtual intermediate optical field.

6. A field mapping optical system according to claim 2 wherein the focusing lens is integrated onto a rear surface of a final optical element of the second optical section.

7. A field mapping optical system according to claim 2 wherein the second optical section is further configured to correct for aberration of the focusing lens.

8. A field mapping optical system according to claim 2 wherein the focusing lens comprises a plurality of lenses.

9. A field mapping optical system according to claim 1 wherein the transmissive refractive optical element is a phase plate.

10. A field mapping optical system according to claim 9 wherein an optical section comprises a phase plate and a further lens.

11. A field mapping optical system according to claim 1 wherein the intermediate optical field is truncated.

12. A field mapping optical system according to claim 1 wherein the distance is in the far-field.

13. A method for designing a field mapping optical system, for converting a light beam having a known spatially coherent first optical field to a second optical field with a required intensity distribution and flat wavefront by creating an intermediate optical field, between the first and second optical fields, the optical system comprising:
one transmissive refractive optical elements, the one elements arranged to provide a first optical section, being an entry optical surface of the one element, which produces an optical field with the desired intensity distribution and a second optical section, being an exit optical surface of the one element, which corrects for phase and provides the flat wavefront;
the first optical section being configured to modify the wavefront of the first optical field to provide an intensity distribution of the intermediate optical field immediately after the second optical section;
the second optical section being configured to modify the wavefront of the beam on exiting the first optical section to provide a wavefront of the intermediate optical field immediately after the second optical section;
the second optical field being created a distance from an exit of the second optical section;
the intermediate optical field being derived from the inverse Fourier transform of the second optical field; and
the transmissive refractive optical element being a monolithic optic, the method comprising the steps:
a) selecting the required intensity distribution for the second optical field;
b) calculating the inverse Fourier transform of the second optical field and deriving the intermediate optical field; and
c) designing the transmissive optical elements to create the intermediate optical field immediately after the second optical section.

14. A method according to claim 13 wherein the method includes a step of selecting the distance.

15. A method according to claim 13 wherein the method includes a step of selecting a lens with a focal length to provide the second optical field at a desired distance.

16. A method according to claim 13 wherein the method includes selecting a desired separation between an exit of the first optical section and an entry of the second optical section.

17. A method according to claim 13 wherein the method includes designing the optical elements to truncate the intermediate optical field so as to fit in an aperture of a focusing lens.

18. A field mapping optical system for converting a light beam having a known spatially coherent first optical field to a second optical field with a required intensity distribution and flat wavefront by creating an intermediate optical field, between the first and second optical fields, the optical system consisting of:
a first single transmissive refractive optical element, the first element arranged to provide a first optical section which produces an optical field with the desired intensity distribution and a second single transmissive refractive optical element, the second element arranged to provide a second optical section which corrects for phase and provides the flat wavefront;
the first optical section being configured to modify the wavefront of the first optical field to provide an intensity distribution of the intermediate optical field immediately after the second optical section;
the second optical section being configured to modify the wavefront of the beam on exiting the first optical section to provide a wavefront of the intermediate optical field immediately after the second optical section;
the second optical field being created a distance from an exit of the second optical section; and
the intermediate optical field being derived from the inverse Fourier transform of the second optical field.

19. A field mapping optical system for converting a light beam having a known spatially coherent first optical field to a second optical field with a required intensity distribution and flat wavefront by creating an intermediate optical field, between the first and second optical fields, the optical system consisting of:
a first single transmissive refractive optical element, the first element arranged to provide a first optical section which produces an optical field with the desired intensity distribution;
a second single transmissive refractive optical element, the second element arranged to provide a second optical section which corrects for phase and provides the flat wavefront; and
a focusing lens;
the first optical section being configured to modify the wavefront of the first optical field to provide an intensity distribution of the intermediate optical field immediately after the second optical section;
the second optical section being configured to modify the wavefront of the beam on exiting the first optical section to provide a wavefront of the intermediate optical field immediately after the second optical section;
the second optical field being created a distance from an exit of the second optical section;
the focusing lens being located after the second optical section to produce the second optical field at a back focal plane of the focusing lens; and
the intermediate optical field being derived from the inverse Fourier transform of the second optical field.

* * * * *